United States Patent
Buxton et al.

(10) Patent No.: US 8,166,018 B2
(45) Date of Patent: Apr. 24, 2012

(54) BROWSING A LIST OF DATA ITEMS

(75) Inventors: Robert F. Buxton, Chandlers Ford (GB); Richard M. W. Harran, Southampton (GB); Andrew I. Hickson, West Wellow (GB); Ian W. Parkson, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1994 days.

(21) Appl. No.: 11/005,818

(22) Filed: Dec. 7, 2004

(65) Prior Publication Data

US 2005/0131908 A1  Jun. 16, 2005

(30) Foreign Application Priority Data

Dec. 10, 2003 (GB) .................................. 0328575.6

(51) Int. Cl.
*G06F 7/00* (2006.01)
(52) U.S. Cl. ........................................ 707/708; 707/709
(58) Field of Classification Search .................. 707/1, 6, 707/8, 9, 205, 206, 708, 709
See application file for complete search history.

(56) References Cited

U.S. PATENT DOCUMENTS

| | | | |
|---|---|---|---|
| 6,055,612 A * | 4/2000 | Spertus et al. | 711/165 |
| 6,226,641 B1 * | 5/2001 | Hickson et al. | 707/8 |
| 6,314,436 B1 * | 11/2001 | Houldsworth | 707/206 |
| 6,317,744 B1 | 11/2001 | Elko et al. | 707/10 |

OTHER PUBLICATIONS

Wynne et al. Conference on System Sciences, 1993, Proceeding of the Twenty-Sixth Hawaii International, pp. 112-121.*
Nick et al, "S/390 cluster technology: Parallel Sysplex", IBM Systems Journal, vol. 36, No. 2, 1997.

* cited by examiner

*Primary Examiner* — Cheyne Ly
(74) *Attorney, Agent, or Firm* — Steven M. Greenberg, Esq.; Carey, Rodriguez, Greenberg & O'Keefe LLP

(57) ABSTRACT

An apparatus browses a list of data items. The apparatus includes a plurality of browse mechanisms each operable to scan concurrently through a list of data items and a plurality of independent groups each comprising two or more of the plurality of browse mechanisms. The browse mechanisms in a group cooperate together to browse the list of data items such that a data item is seen by only one member of the group.

31 Claims, 7 Drawing Sheets

BROWSING A LIST OF DATA ITEMS

BACKGROUND OF THE INVENTION

This invention relates to the field of browsing a list of data items, and more particularly, to identifying different cooperating groups of browser mechanisms.

A list of data items to be browsed is provided. The list can be any collection of data items which may be built on the fly or may pre-exist. A list of data items is defined in a broad sense and may include a database, a list of files, a messaging queue, pages from an online system such as the Internet, etc.

Browsing a list of data items involves scanning through the list of data items or references to the data items. Browsing involves observing the data in the list in a non-destructive manner. A browser scans through the list reading all or part of the data items without removing or changing the data. A browser can copy data items during browsing but does not destroy or alter the original list of data items being browsed.

Browsing may be carried out to identify a specific data item, to search for data items that match search criteria, or to locate anything that looks to be of interest where the browser reads part of the data item or a heading and decides on the fly if it is of interest.

One or more browsers may typically establish what data items exist on a list and may organise the data items, for example, by allocating the data items to other processor threads to carry out actions on the data items. Other processor threads may actually remove the data items from the list in order to process them.

A list of data items may include the data items in an order according to a wide number of systems. Data items may be prioritised in a certain order, they may be chronological, alphabetical, by subject, etc. This means that a data item that is added to a list may be added in any position in the list.

In a messaging system in which the list of data item is a message queue, both destructive message retrieval and non-destructive message retrieval (browse) may be used. Messaging applications which browse a queue of messages looking for messages which meet certain criteria and, once a suitable message is found, may be written to perform a destructive get of that message.

As an example, a message queue may contain red, amber and green messages and an application may wish to consume all of the green messages. The application may browse the queue and remove each green message, thus every message would be read once all of the green messages are read once (with a non-destructive get operation) and removed (with a destructive get operation). However, if N multiple instances of the application were executed in parallel and one instance of this application could not remove the green messages fast enough (which may happen because the destructive get operation involves physical input/output), then each red and amber message in the queue would be read N times.

BRIEF SUMMARY OF THE INVENTION

According to one aspect of the present invention, a method of browsing a list of data items comprises scanning concurrently through a list of data items using a plurality of browse mechanisms and forming a plurality of independent groups. Each group may comprise two or more of the plurality of browse mechanisms. The browse mechanisms corresponding to one of the plurality of groups cooperate together to browse the list of data items such that a data item is seen by only one member of the group.

According to another aspect of the present invention, an apparatus may be used for browsing a list of data items. The apparatus comprises a plurality of browse mechanisms each operable to scan concurrently through a list of data items and a plurality of independent groups each comprising two or more of the plurality of browse mechanisms. The browse mechanisms in a group cooperate together to browse the list of data items such that a data item is seen by only one member of the group.

According to yet another aspect of the present invention, a computer program product comprises a computer readable medium having computer readable program code embodied therein. The computer readable program code comprises computer readable program code configured to scan concurrently through a list of data items using a plurality of browse mechanisms and computer readable program code configured to form a plurality of independent groups, each group comprising two or more of the plurality of browse mechanisms. The browse mechanisms that correspond to one of the plurality of groups cooperate together to browse the list of data items such that a data item is seen by only one member of the group.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
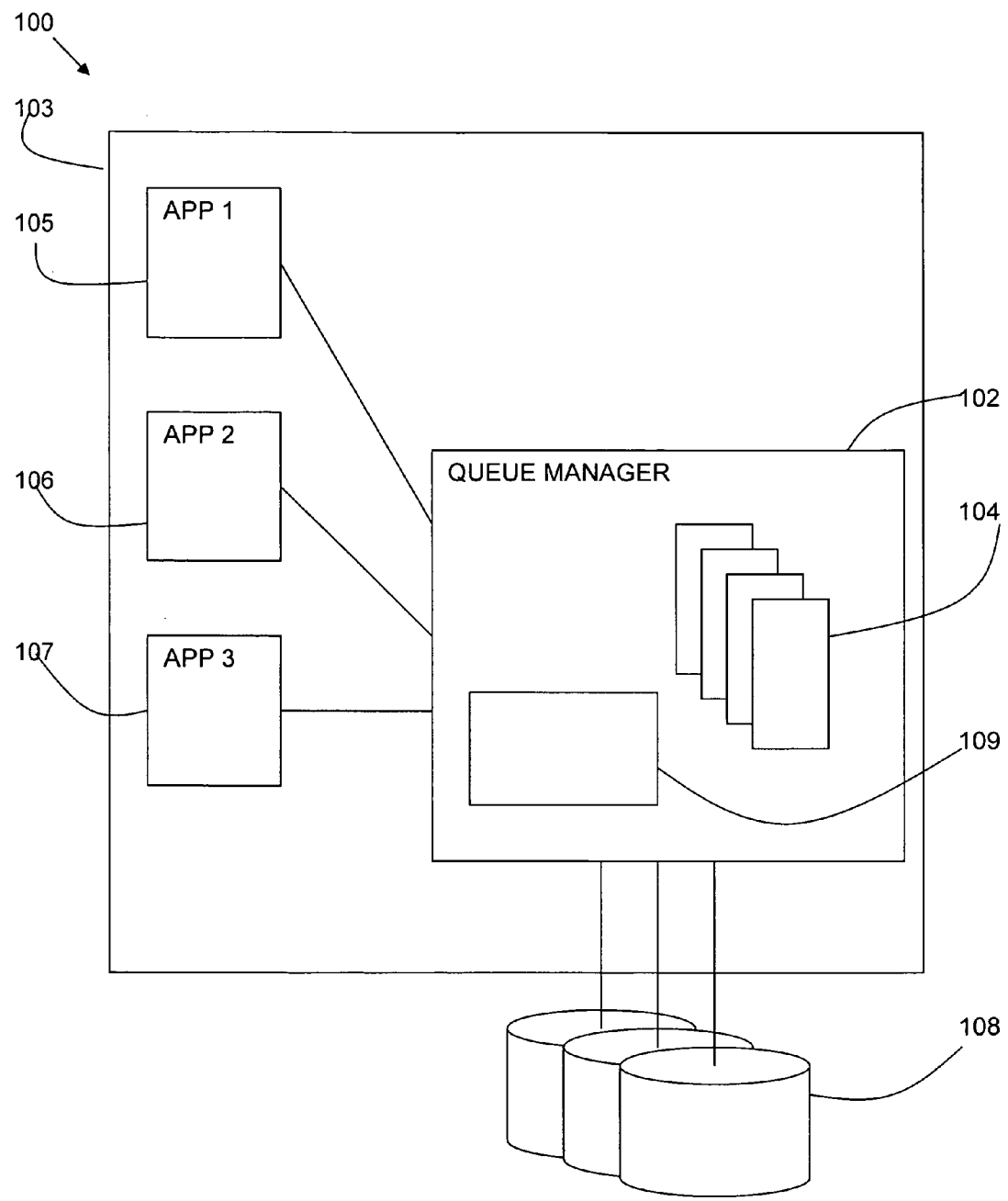
FIG. 1 is a block diagram of a messaging system.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The embodiments described herein are given in the context of a messaging environment, specifically WebSphere® MQ messaging (formerly known as MQSeries®). WebSphere® and MQSeries® are trademarks of International Business Machines Corporation in the United States, other countries, or both. Details of WebSphere MQ messaging are provided at <www.ibm.com/software/integration/wmq>. As stated above, the invention could equally be applied to other applications and environments in which there is a list of data items to be scanned or browsed.

Messaging and queuing enables applications to communicate without having a private connection to link them. Applications communicate by putting messages on message queues and by taking messages from message queues. The communicating applications can be running on the same processor in a single environment, on the same processor in different environments, or on different processors in different environments.

An application talks directly to a local queue manager on the same processor as the application itself using the Message Queue Interface (MQI). The MQI is a set of calls that applications use to ask for the services of a queue manager. There are two basic operations: put a message on a queue (using the MQPUT call), and take a message from a queue (using the MQGET call).

Messages can be ordered in the queue in a number of ways. The most frequently used ordering systems in messaging queues are the first in, first out (FIFO) system and the priority ordering system. Priority ordering puts the messages in an order in the queue according to a pre-determined priority system. For example, messages from a particular client application may be given a higher priority than those from another application and therefore the ordering reflects from which client application the messages have originated.

A message queue is one form of list of data items to which the present invention may be applied. In the context of other forms of lists of data items, for example, such as databases, ordering can take many forms. For example, ordering in a database may be alphabetical, chronological, by subject, by label, by contents, etc.

FIG. 1 shows a schematic representation of a messaging system 100. The messaging system 100 has a queue manager 102 which manages local queues 104 for applications 105, 106, 107 running within a single processor environment 103. The queue manager 102 owns and manages resources 108 which are used by the messaging system 100. The resources 108 include page sets that hold object definitions and message data, logs for recovering messages in the event of a queue manager failure, processor storage, and connections through which different application environments can access the queue manager 102. The queue manager 102 also includes a channel initiator 109 which enables the queue manager 102 to send and receive messages to and from queues managed by other queue managers enabling distributed queuing. The channel initiator 109 sets up communication links between the queue managers.

Figure 2:
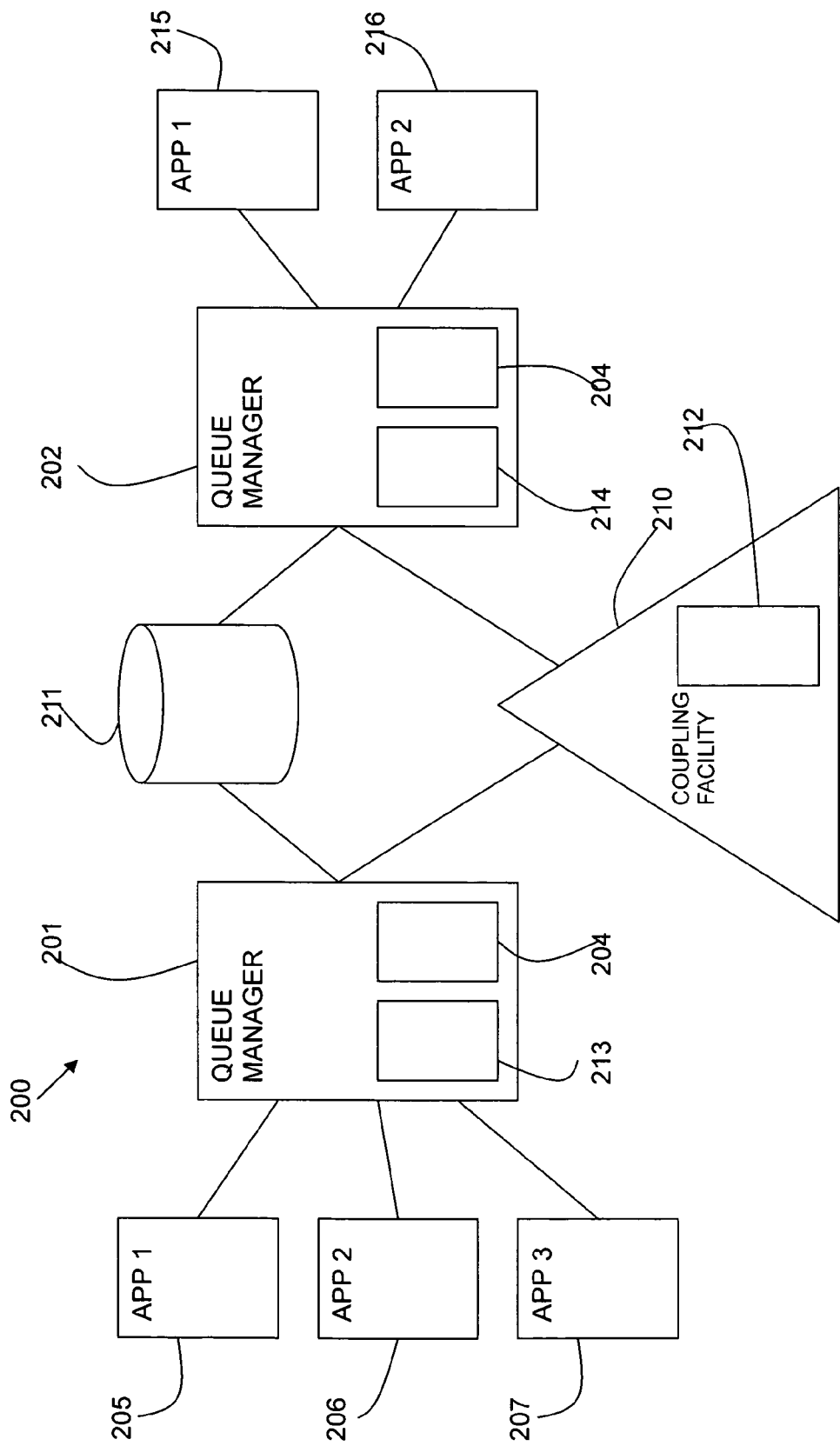
FIG. 2 is a block diagram of a messaging system with a shared queue.

FIG. 2 shows another messaging system 200 in which a plurality of queue managers share queues. A group of queue managers can form a queue sharing group in which the queue managers all have access to one or more shared message queues to enable parallel processing of messages by application programs connected to any one of the queue managers in the queue sharing group.

FIG. 2 shows a first queue manager 201 with local applications 205, 206, 207 and a second queue manager 202 with local applications 215, 216. The first and second queue managers 201, 202 belong to a queue-sharing group which means that they can access the same set of shared queues 204. A message can be put on a shared queue 204 on one queue manager 201 and retrieved from the queue 204 on a different queue manager 202. This provides a mechanism for communication within a queue-sharing group that does not require channels to be active between queue managers 201, 202.

The messages on a shared queue 204 are stored on list structures 212 in a coupling facility 210. The definition of a shared queue 204 and other object definitions are stored in a shared data repository 211. All queue managers 201, 202 in a queue-sharing group may also maintain their own logs and page sets to use non-shared local queues 213, 214.

In addition to queue-sharing groups, queue managers can be grouped in a cluster such that they can make the queues that they host available to every other queue manager in the cluster. Any queue manager can send a message to any other queue manager in the same cluster without the need for many of the object definitions required for standard distributed queuing. Each queue manager in the cluster has a single transmission queue from which it can transmit messages to any other queue manager in the cluster. A queue may be provided by any of the above arrangements, which can be browsed by more than one application in order to scan the messages held in a queue.

Figure 3:
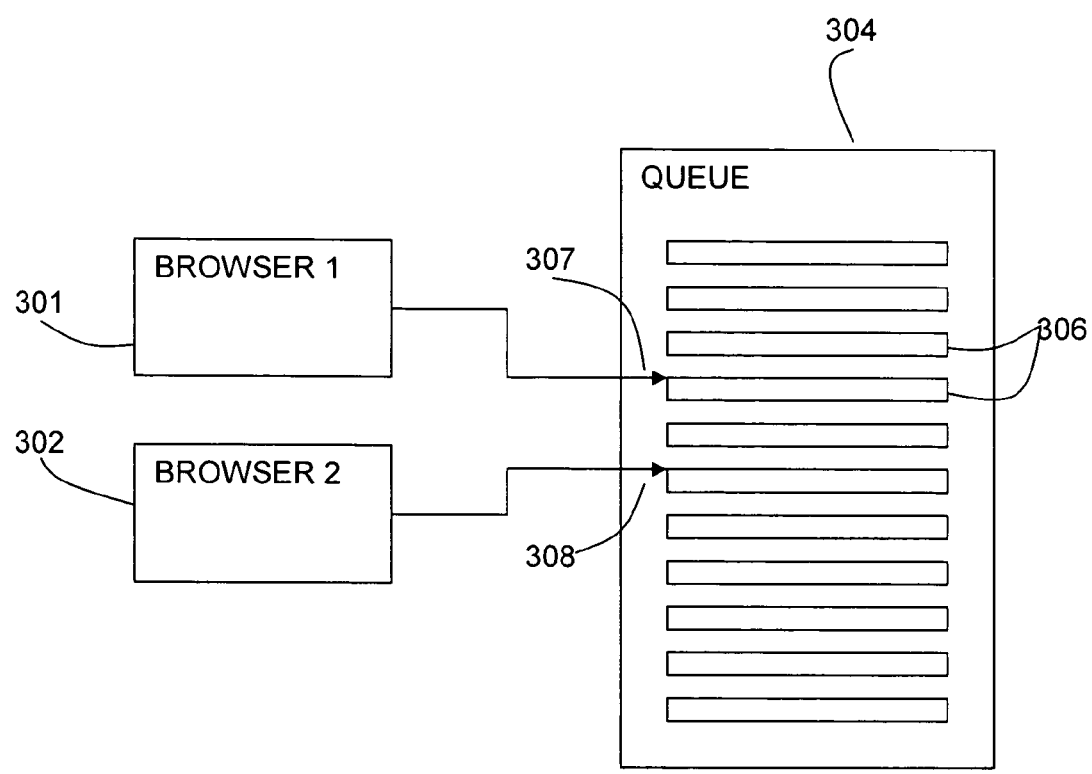
FIG. 3 is a schematic diagram of a list of data items being browsed.

FIG. 3 shows a queue 304 containing a plurality of data items, which in this case are messages 306. First and second browsers 301, 302 are shown browsing the queue 304 simultaneously. Each browser 301, 302 has a cursor 307, 308 which is a logical pointer to messages 306 on the queue.

Browsing messages on a queue in WebSphere MQ is carried out by an application using the Messaging Queue Interface to call its local queue manager using the MQGET call as follows:
1. Call MQOPEN to open the queue for browsing, specifying the MQOO_BROWSE option.
2. To browse the first message on the queue, call MQGET with the MQGMO_BROWSE_FIRST option. To find a particular message selection criteria such as message id, correlation id, group id, message token may be specified. Use call MQGET repeatedly with the MQGMO_BROWSE_NEXT option to step through many messages.
3. Call MQCLOSE to close the queue.

When a queue is opened with the MQOO_BROWSE option, a browse cursor is established, positioned logically before the first message on the queue.

More than one browse cursor can be active from a single application. More than one browse cursor can also be active from multiple applications scanning the same queue.

When an MQGET call is made for browsing, one of the following options can be specified to retrieve messages from the queue non-destructively.

MQGMO_BROWSE_FIRST—This option gets a copy of the first message on a queue that satisfies the conditions specified in a message descriptor structure. The previous position of the browse cursor is ignored. The message remains on the queue and the browse cursor is positioned on this message.

MQGMO_BROWSE_NEXT—This option gets a copy of the next message that satisfies the conditions specified in the message descriptor structure. The browse cursor browses from the current position in the queue to the next message on the queue that satisfies the selection criteria. Again, this option does not remove a message from the queue and is used to read the messages sequentially in the queue.

MQGMO_MSG_UNDER_CURSOR—This option can subsequently be used with a non-browse MQGET call to remove the message from the queue.

MQGMO_LOCK—This option locks the message that is browsed, so that the message becomes invisible to any other handle open for the queue. Only one message can be locked per queue handle.

There are instances where messages can be skipped by a browse. These include:
A new message is put with a higher priority than the current message being browsed.
A message is locked by another handle using MQGMO_LOCK.
An uncommitted message, which is in the process of being put on a queue. Messages within a unit-of-work cannot be browsed until the unit-of-work is committed.
A committed message is being got by another unit-of-work but the unit-of-work rolls back returning the message to the queue.

Skipped messages will not be seen unless the MQGMO_BROWSE_FIRST option is used to work though the queue again. However, this will also return messages that have previously been seen.

According to an aspect of the present invention, multiple groups are provided for concurrently scanning a list of data items with each group being formed of multiple browse handles cooperating with one another to perform a browse of the list of data items.

A group name is provided and a browse cursor can be associated with the group name. When any member of the group browses a data item in the list, the browse cursor associated with the group name is updated. Multiple groups each with its own named browse cursor can be accommodated to browse the same list simultaneously. A browse handle can belong to more than one cooperating group.

Alternatively, each browse handle in a group can have its own browse cursor to point to the current browse location in the list of data items for the browse handle.

A group name can also have an associated marker which can identify data items that have been browsed by the group of cooperating browse handles. Only unmarked data items can then be rescanned in a browse operation.

Each browse handle can have its own mark which indicates data items which they have personally seen as well as a group mark. Each time a member of the group browses a data item, it marks that data item with its own mark and also with a group mark. This enables individual browse handles to browse data items which they themselves have not previously seen and to browse data items which have not been seen by another member of a cooperative group.

Figure 4A:
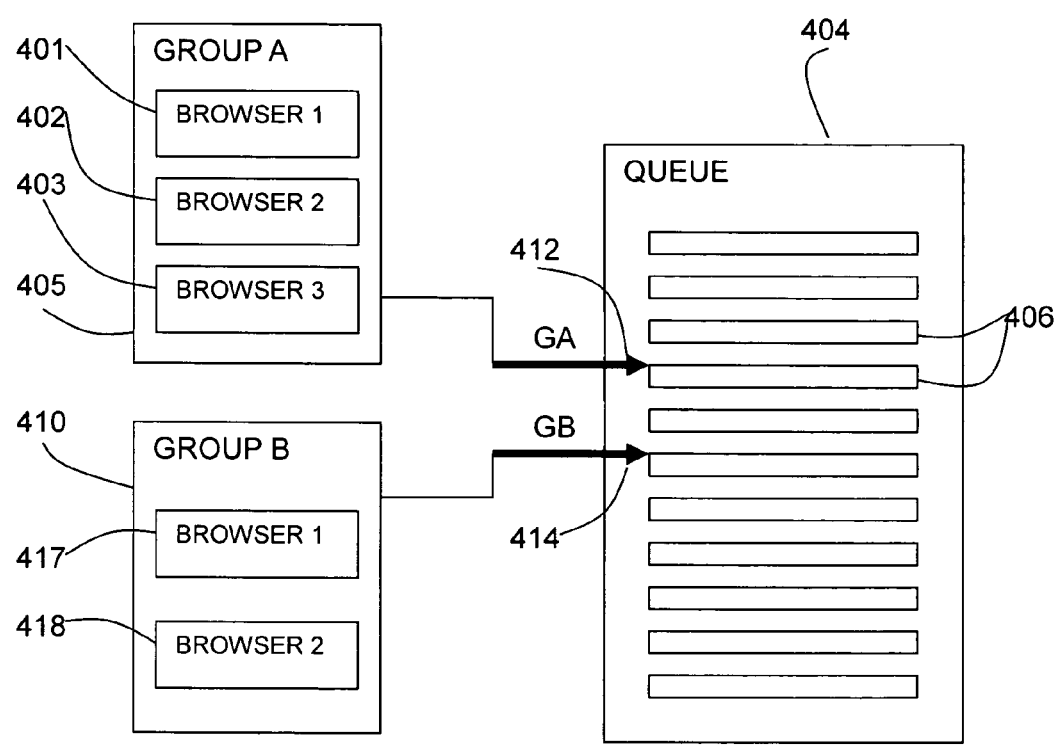
FIGS. 4A and 4B are schematic diagrams of two groups of cooperating browsers in accordance with the present invention.

Referring to FIG. 4A, one aspect of the present invention is shown in which group cursors are provided. A list of data items is shown in the form of a messaging queue 404 holding messages 406. A group 405 of cooperating browse handles 4001, 402, 403 is provided and has been named "Group A". Each browse handle 401, 402, 403 within the group 405 browses the queue 404.

A group 405 has a single named cursor 412 which is updated once any browse handle 401, 402, 403 that is a member of the group has browsed a message 406. FIG. 4A shows a cursor 412 named for Group A as "GA" which is updated once any one of browse handles 401, 402, 403 has browsed a message 406. A second group 410, "Group B", is also shown browsing the same queue 404. The second group 410 has its own named cursor 414 "GB" which is updated when any browse handle 417, 418 that is a member of the second group 410 browses a message 406.

Figure 4B:
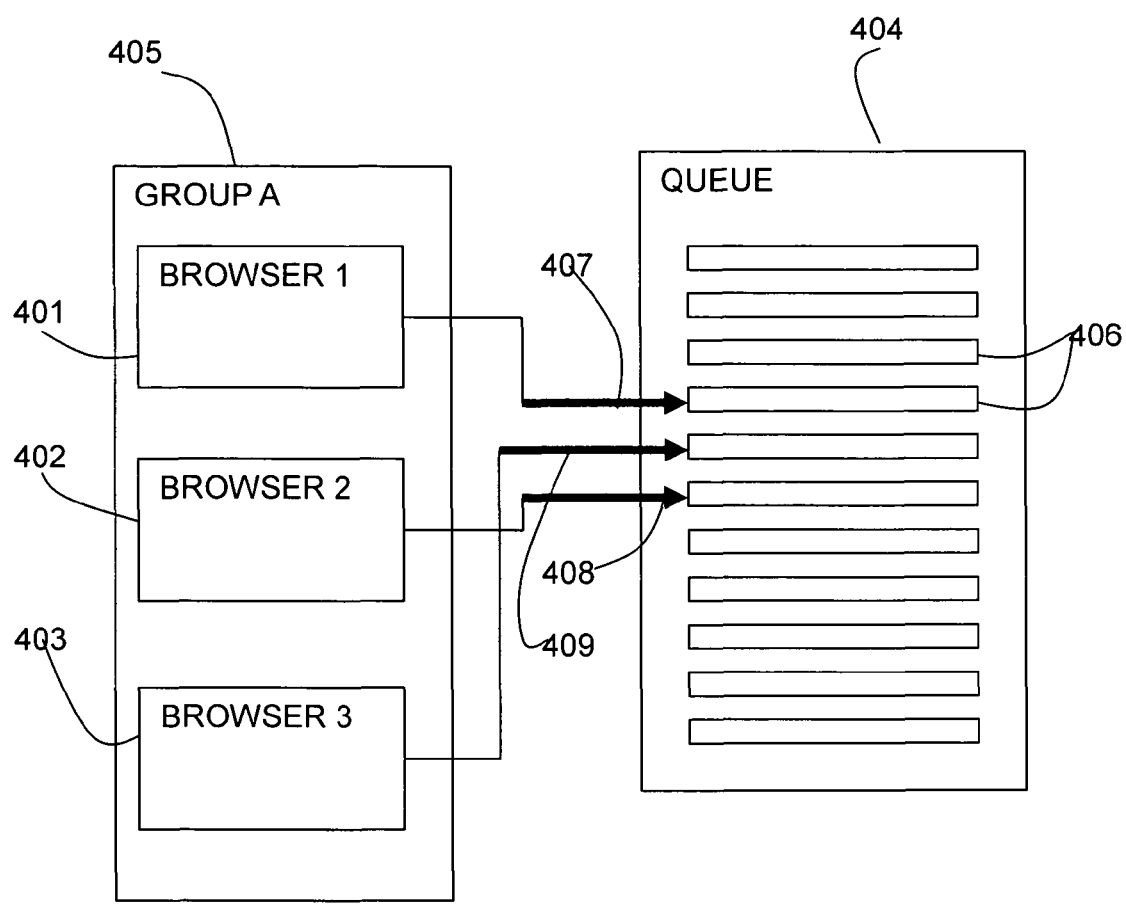

Referring to FIG. 4B, another aspect of the present invention is shown in which each browse handle 401, 402, 403 in a group 405 has its own cursor 407, 408, 409.

The following is an implementation using options that are added to WebSphere MQ messaging. In the WebSphere MQ messaging environment, there is provided a new open option to identify a cooperative group. This indicates that the object handle returned by MQOPEN will be considered to be part of a cooperative set of handles. This option is provided in addition to the MQOO_BROWSE option.

A mechanism is also described to allow an open handle that is browsing a queue in a cooperative manner to mark messages for all handles that are cooperating with it. A first new get message option is provided to mark messages browsed by any one of the cooperative set of browse handles. After a successful call to MQGET that specifies this option, the message that is returned, or that is identified by the message token that is returned, is considered by any object handle that is part of the cooperating set of handles to be marked for the cooperating set of handles.

If a message is marked for a cooperative group, the message is not considered to be marked for each individual handle in the set at a handle level. That is, this is not exactly equivalent to each handle in the cooperative group browsing the message with the individual marking option, but all handles in the set can determine that the message has been marked. The message is not removed from the queue.

This first new get option for a group is only valid if the object handle used was returned by a successful call to MQOPEN that specified the option identifying the group and one of the following get message options is also specified.
   MQGMO_BROWSE_FIRST
   MQGMO_BROWSE_NEXT
   MQGMO_BROWSE_MSG_UNDER_CURSOR There is provided a second new get message option to browse messages that are unmarked for a cooperative group. A call to MQGET that specifies this option will not return a message that is already considered to be marked for this cooperative group.

There is also provided a third new get message option for a cooperative group to unmark messages previously marked for a particular specified cooperative group. After a call to MQGET that specifies this option, the message located is no longer considered by all other open handles in the set of cooperating handles to be marked for the cooperating set. It is still considered to be marked at handle level by any open handle that considered it to be marked at handle level before this call.

This call is only valid using an open handle that was returned from a successful call to MQOPEN with the option identifying the cooperative group. This call should succeed even if the message is not considered to be marked by the cooperative group.

In accordance with one aspect of the present invention, a marker indicates the data items in a list of data items which have been browsed by a particular group of cooperating browse handles. A different mark may be used for each group.

Figure 5B:
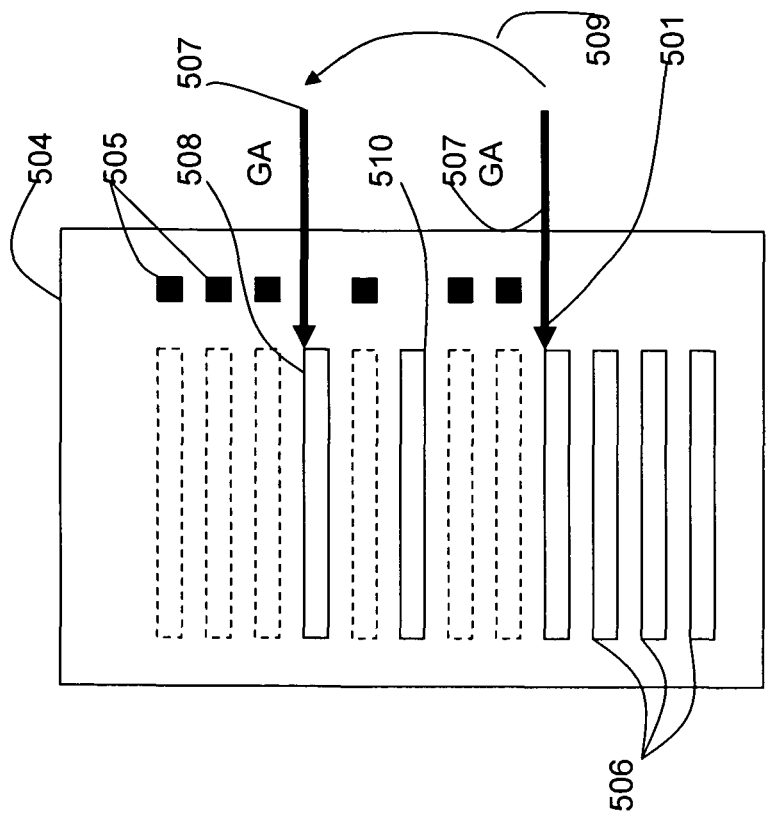
FIGS. 5A and 5B are schematic diagrams of lists of data items with group markers in accordance with one aspect of the present invention.
Figure 5A:
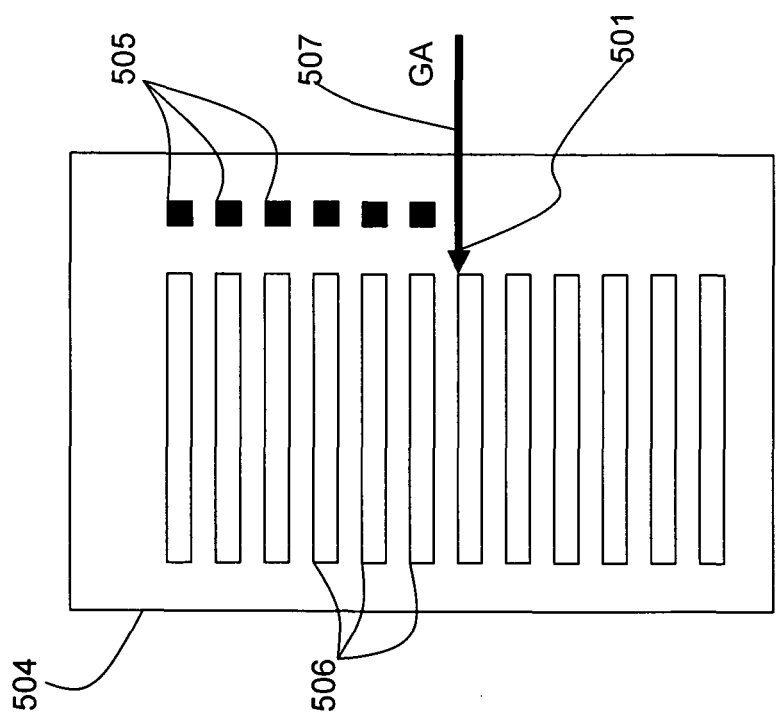

Referring to FIGS. 5A and 5B, a list of data items 504 (which may be, for example, a message queue) is shown with a plurality of data items 506. In FIG. 5A, a named group cursor "GA" 507 points to a first position 501 in the list 504 which is the position to which the cooperating group of browse handles has browsed. Each data item 504 which has been seen by any one of the members of the cooperating group of browse handles is marked with a mark 505 identifying the group.

FIG. 5B shows new data items 508 and 510 added to the list above the current first position 501 of the cursor "GA" 507. The cursor "GA" 507 rescans the list getting data items which are not marked with the mark 505 identifying Group A. The named cursor "GA" 507 jumps back 509 to the newly added data item 508 which is unmarked.

One of the browse handles that is a member of Group A can browse the new data items 508 and 510. No other data items are shown in the rescan as they have been previously marked for the group Although browses are normally sequential, the group browse can also be used with non-sequential browses where match options are used to specify which messages are to be located. It is possible to use both sequential and non-sequential options within one group of browse handles.

Data items which have been marked under one group can be removed from a list by a browse handle which does not belong to the group as the data item is only not returned for subsequent browses within the first group. This allows one application to pass a reference to a data item to another application which will then process the data item and for the data item to be logically removed from the first application's view of the list.

Each browse handle could individually maintain a list of messages globally marked by cooperating browse handles. A single bit map may be maintained for a queue which indicates which handles have group marked a message. As well as providing a single entry to be maintained, additional browser groups require minimal additional storage (8 handles/byte). A bit map is a data structure in memory that represents information in the form of a collection of individual bits and is used as a representation indicating which data items have a marker. Each location in the bit map for a data item represents a particular browser group and can have a mark (1) indicating that it has been seen and marked by a member of the group or no mark (0) indicating that it has not been seen and hence not marked.

Figure 6:
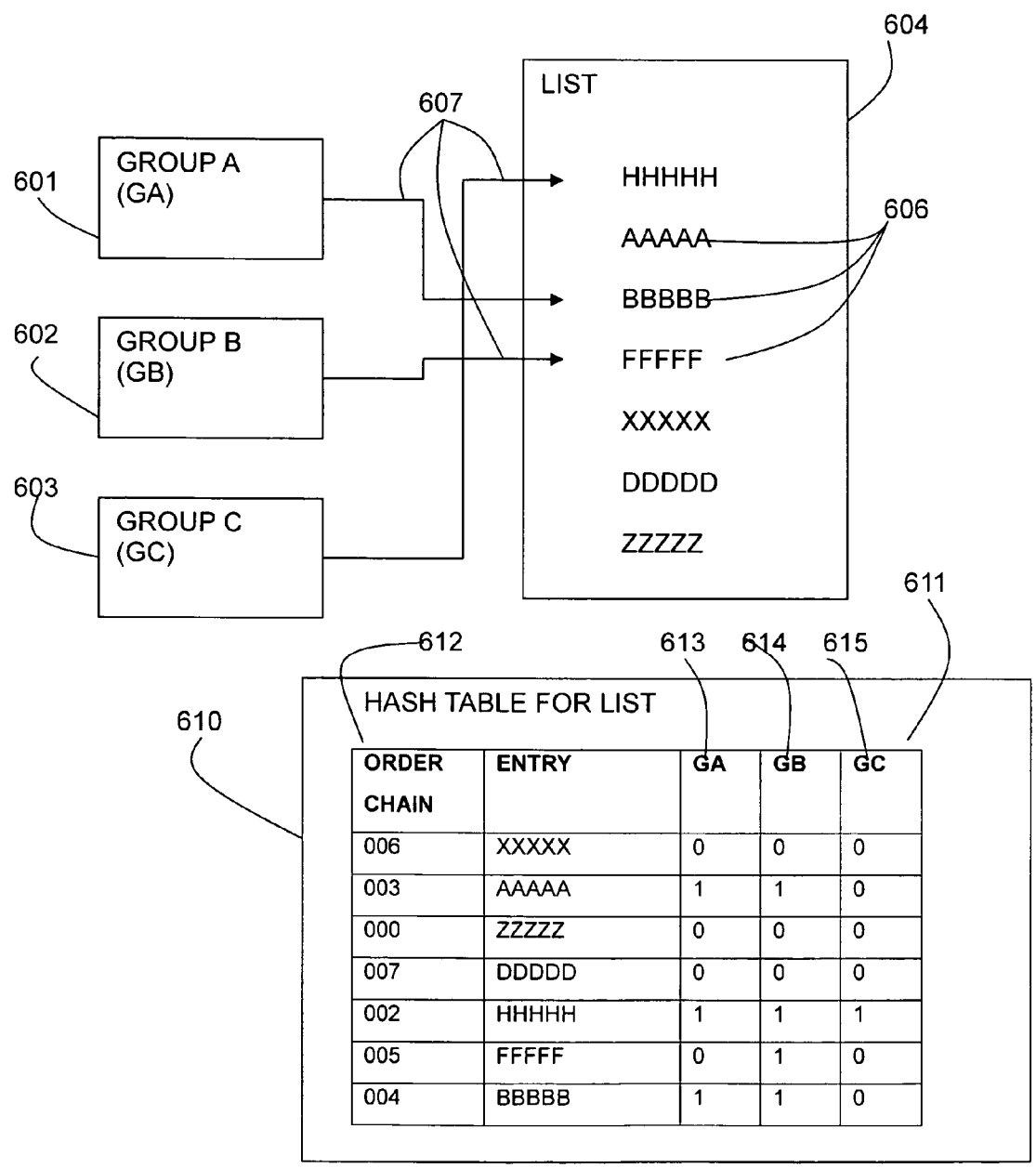
FIG. 6 is a simplified schematic diagram of system for marking a list of data items in accordance with an aspect of the present invention.

The bit map structure can be held in a hash table, a binary tree or another form of data structure. FIG. 6 shows a list 604 with data items 606. The browse handle members of three browse groups GA, GB, GC 601, 602, 603 are browsing the list 604 simultaneously. Each group 601, 602, 603 has a cursor 607 logically pointing to the position in the list which the combined group of browse handles has reached.

A simplified hash table 610 is shown as it would be maintained for the list 604. The hash table 610 includes a bit map 611 which indicates which groups have marked a data item 606. Each data item 606 is stored in the hash table 610 with a queue order chain 612 with associated bit references for each group GA, GB, GC 613, 614, 615. Messages marked by individual browse handles can also be shown in the bit map in addition to group marks.

The groups are independent and the cursors and marks of one group do not impact on the results of other groups event though they may be represented in the same bit maps.

Data items 606 in the form of messages can be identified by message tokens in the hash table 610. A message token is used to identify uniquely an instance of a message on a queue. Other forms of data items can similarly be identified by references such as headers or tokens.

As an example, the following method is used to create and maintain a hash table for a list of data items in the form of a private queue.

In a browsing operation with no match criteria specified, searching is started from the beginning of a queue. For the first unlocked message found, an entry is created in the hash table using the message token and marking it for a cooperative group of browse handles. The table entries are chained together in queue order within priority or order of the queue. For locked messages, an entry is also created and chained but not marked. This enables messages that subsequently become available prior to the point reached by the browse to be detected.

On subsequent browse requests from the same or a different browse handle in a group, the queue order chain of message token entries is used to run through the previously browsed messages looking for messages that have not yet been marked for the group. This avoids the need to go into a buffer manager of the queue manager. Only when the end of the chain for a priority is reached will the buffer manager chains need to be looked at to see if there are any new or not yet browsed messages to be considered and added to the queue order chain.

To avoid the overhead of re-scanning the chain each time, each group of cooperating browse handle maintains two cursors. In addition to the existing browse cursor, a low water mark (LWM) cursor is provided to indicate the point from which the queue must be rescanned. The LWM cursor consists of a message token and the message priority. An indicator is also provided to show that the browse handle is using the cooperative browse option. The LWM cursors for all groups are chained from the hash table header.

As the queue is browsed and the queue order chain is built, the LWM is updated until the first uncommitted put message is reached. The LWM is not updated further as a scan is carried out for an unmarked message. On subsequent requests to "get first unmarked" message for a group, the scanning can start scanning from the LWM and, if the message is now committed, the LWM can be updated as before until the next uncommitted message is reached. If the LWM message no longer exists in the hash table, the LWM is reset and the scan is restarted from the beginning of the queue.

When using match criteria in a browsing operation the appropriate index can be used to find the first eligible message. The associated hash table is entry is located using the message token. If it exists and is not already marked, it is updated to mark the message. If it is already marked the process is repeated for the next message on the match criteria synonym chain. If a hash table entry does not exist, one is created but it is not chained to the queue order chain since the correct position cannot easily be determined.

For a non-indexed queue the same procedure could be adopted as above using the existing matching logic to find the correct message by searching through the buffer manager pages to find the correct message.

The message token hash table is created by the first open call with the co-operative option. At the same time the interval processor task will be created. The hash table header will contain a bit map showing which browse groups are free/in use. A browse group will be assigned the first free slot in the bit map.

When a browse group is closed, its slot will not be immediately marked as free. Instead, the corresponding slot in a closed group bit map in the table header will be set so that the interval processor can clean up and then mark the slot as free. The LWM cursor can be freed at browse group close. The entire hash table structure will only be deleted when the last browse group is closed.

Periodically, the interface processor task wakes up to release long held global group marks. The wake up interval can be fixed or may be a queue manager, queue or handle attribute.

In a messaging environment in which the list of data items is a shared queue, the above method of creating and maintaining a hash table is altered accordingly. The main problem with shared queues is how to let other members of the queue sharing group know what is happening. Everything has to be communicated through the coupling facility; however, to keep performance levels, an excessive number of coupling facility calls must be avoided.

In most cases, the number of concurrent browse groups will be fairly small, for example, less than ten on a queue manager. A fixed size of bit map can be used to implement expected numbers of browse groups. However, the hash table could cope with an unlimited number by assigning each group a number and dividing the number by the number of entries in the bit map. The quotient would indicate which map extent was required and the remainder the index within the map.

Since there are multiple processes such as browse handles, getters, putters and interval processors all accessing the hash table in different ways, serialisation techniques may be needed to ensure that users of the table are protected from each other.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of browsing a list of data items, the method comprising:
  scanning concurrently through a list of data items using a plurality of browse mechanisms;
  forming a plurality of independent groups, each group comprising two or more of the plurality of browse mechanisms;

wherein the browse mechanisms corresponding to one of the plurality of groups cooperate together to browse the list of data items such that a data item is seen by only one member of the group.

2. The method of claim 1, further comprising providing a cursor as a logical pointer in the list of data items for each group, and wherein scanning concurrently through a list of data items using a plurality of browse mechanisms comprises scanning a data item by any one of the plurality of browse mechanisms in a group and updating the logical pointer for the group.

3. The method of claim 2, wherein the cursor comprises an identification mechanism for identifying the group to which it relates.

4. The method of claim 1, further comprising providing a cursor as a logical pointer in the list of data items for each of the plurality of browse mechanisms.

5. The method of claim 1, further comprising providing a marker representing one of the groups in relation to data items once they have been scanned by one of the plurality of browse mechanisms in the group.

6. The method of claim 5, wherein providing a marker representing one of the groups in relation to data items once they have been scanned by one of the plurality of browse mechanisms in the group does not return marked data items on subsequent scans of the list of data items by any of the plurality of browse mechanisms which is a member of the group.

7. The method of claim 1, further comprising providing a marker representing one of the plurality of browse mechanisms in relation to data items once they have been scanned by the one browse mechanism.

8. The method of claim 7, wherein providing a marker representing one of the plurality of browse mechanisms in relation to data items once they have been scanned by the one browse mechanism does not return marked data items on subsequent scans of the list of data items by the one browse mechanism.

9. The method of claim 5, further comprising unmarking a data item on request by one of the plurality of browse mechanisms.

10. The method of claim 1, wherein scanning concurrently through a list of data items using a plurality of browse mechanisms comprising scanning references to the data items.

11. The method of claim 1, wherein the list of data items is scanned sequentially by one of the plurality of browse mechanisms.

12. The method of claim 1, wherein the list of data items is scanned by matching criteria.

13. The method of claim 1, wherein the list of data items is a messaging queue.

14. An apparatus for browsing a list of data items, the apparatus comprising:
a plurality of browse mechanisms each operable to scan concurrently through a list of data items; a plurality of independent groups each comprising two or more of the plurality of browse mechanisms;
wherein the browse mechanisms in a group cooperate together to browse the list of data items such that a data item is seen by only one member of the group.

15. The apparatus of claim 14, further comprising a cursor providing a logical pointer in the list of data items for each group, and wherein one of the plurality of browse mechanisms updates the logical pointer for the group upon scanning a data item.

16. The apparatus of claim 15, wherein the cursor comprises an identification mechanism for identifying the group to which it relates.

17. The apparatus of claim 14, further comprising a cursor as a logical pointer in the list of data items for each of the plurality of browse mechanisms.

18. The apparatus of claim 14, further comprising a marker representing one of the plurality of groups applied to each data item once the data item has been scanned by one of the plurality of browse mechanisms in the one group.

19. The apparatus of claim 18, wherein data items marked for one of the plurality of groups are not returned on subsequent scans of the list of data items by any of the plurality of browse mechanisms which is a member of the one group.

20. The apparatus of claim 14, further comprising a marker representing one of the plurality of browse mechanisms in relation to data items once they have been scanned by the one browse mechanism.

21. The apparatus of claim 20, wherein data items marked for the one browse mechanism are not returned on subsequent scans of the list of data items by the one browse mechanism.

22. The apparatus of claim 14, further comprising a mechanism for unmarking a data item on request by one of the plurality of browse mechanisms.

23. The apparatus of claim 14, wherein one of the plurality of browse mechanisms scans references to the data items.

24. The apparatus of claim 14, wherein one of the plurality of browse mechanisms scans the list of data items sequentially.

25. The apparatus of claim 14, wherein one of the plurality of browse mechanisms scans the list of data items by matching criteria.

26. The apparatus of claim 14, wherein the list of data items is a messaging queue.

27. A computer program product comprising: a computer readable storage medium storing thereon computer readable program code embodied therein, the computer readable program code comprising:
computer readable program code configured to scan concurrently through a list of data items using a plurality of browse mechanisms;
computer readable program code configured to form a plurality of independent groups, each group comprising two or more of the plurality of browse mechanisms;
wherein the browse mechanisms corresponding to one of the plurality of groups cooperate together to browse the list of data items such that a data item is seen by only one member of the group.

28. The computer program product of claim 27, further comprising computer readable program code configured to provide a cursor as a logical pointer in the list of data items for each group, and wherein computer readable program code configured to scan concurrently through a list of data items using a plurality of browse mechanisms comprises computer readable program code configured to scan a data item by any one of the plurality of browse mechanisms in a group and update the logical pointer for the group.

29. The computer program product of claim 27, further comprising computer readable program code configured to provide a cursor as a logical pointer in the list of data items for each of the plurality of browse mechanisms.

30. The computer program product of claim 27, further comprising computer readable program code configured to provide a marker representing one of the groups in relation to data items once they have been scanned by one of the plurality of browse mechanisms in the group.

31. The computer program product of claim 27, further comprising computer readable program code configured to provide a marker representing one of the plurality of browse mechanisms in relation to data items once they have been scanned by the one browse mechanism.

\* \* \* \* \*